(12) United States Patent
Kollmitz et al.

(10) Patent No.: US 12,737,694 B2
(45) Date of Patent: Sep. 15, 2026

(54) HARDWARE ACCELERATOR FOR DECISION TREE ENSEMBLE USING RANK-BASED THRESHOLD EVALUATION WITH FEATURE-GROUPED MEMORY

(71) Applicant: Albert-Ludwigs-Universität Freiburg, Freiburg (DE)

(72) Inventors: Jan Kollmitz, Freiburg (DE); Yiannos Manoli, Freiburg (DE); Alexander Bleitner, Freiburg (DE)

(73) Assignee: Albert-Ludwigs-Universitaet Freiburg, Freiburg (DE)

( * ) Notice: Subject to any disclaimer, the term of this patent is extended or adjusted under 35 U.S.C. 154(b) by 820 days.

(21) Appl. No.: 18/001,991

(22) PCT Filed: Jun. 17, 2021

(86) PCT No.: PCT/EP2021/066411

§ 371 (c)(1),
(2) Date: Dec. 15, 2022

(87) PCT Pub. No.: WO2021/255171

PCT Pub. Date: Dec. 23, 2021

(65) Prior Publication Data

US 2023/0237387 A1 Jul. 27, 2023

(30) Foreign Application Priority Data

Jun. 19, 2020 (DE) ..................... 10 2020 116 293.6

(51) Int. Cl.
*G06N 20/20* (2019.01)

(52) U.S. Cl.
CPC .................................... *G06N 20/20* (2019.01)

(58) Field of Classification Search
None
See application file for complete search history.

(56) References Cited

U.S. PATENT DOCUMENTS 8,732,110 B2 5/2014 Zhang et al.
8,918,771 B2 * 12/2014 Dunn .................. G06F 9/45508 717/136

(Continued)

FOREIGN PATENT DOCUMENTS

CN 106133721 A 11/2016
JP 2009122851 A 6/2009

(Continued)

OTHER PUBLICATIONS

Lucchese et al., QuickScorer: A Fast Algorithm to Rank Documents with Additive Ensembles of Regression Trees; SIGIR '15, Aug. 9-13, 2015, Santiago, Chile; pp. 73-82 (Year: 2015).*

(Continued)

*Primary Examiner* — Alan Chen
(74) *Attorney, Agent, or Firm* — Slater Matsil, LLP

(57) ABSTRACT

In an embodiment a method for classification of a decision tree ensemble include saving of threshold values representative of decision trees in the decision tree ensemble into one group per feature to be classified, sorting of the threshold values of a group according to a threshold index, conducting a node comparison of the threshold values of a corresponding group of threshold values, outputting a rank as a result of the node comparison, wherein the rank represents a encoded address to representative of the threshold value and determining a class of the features to be classified as a function of ranks.

15 Claims, 10 Drawing Sheets

(56) References Cited

U.S. PATENT DOCUMENTS

| | | | | |
|---|---|---|---|---|
| 8,954,661 | B2 * | 2/2015 | Lines | G06F 16/90348 711/108 |
| 9,218,572 | B2 | 12/2015 | Hido | |
| 10,332,008 | B2 | 6/2019 | Burger et al. | |
| 2012/0023082 | A1 * | 1/2012 | Kotha | G06F 16/24558 707/706 |
| 2013/0179377 | A1 * | 7/2013 | Oberg | G06N 20/00 706/45 |
| 2015/0262062 | A1 | 9/2015 | Burger et al. | |
| 2015/0262064 | A1 | 9/2015 | Burger et al. | |
| 2018/0217991 | A1 | 8/2018 | Dato et al. | |
| 2020/0125097 | A1 * | 4/2020 | Juliato | G06N 5/01 |

FOREIGN PATENT DOCUMENTS

| | | | |
|---|---|---|---|
| JP | 2017517082 | A | 6/2017 |
| WO | 2011085577 | A1 | 7/2011 |

OTHER PUBLICATIONS

R. Struharik, Decision Tree Ensemble Hardware Accelerators for Embedded Applications; SISY 2015 • IEEE 13th International Symposium on Intelligent Systems and Informatics • Sep. 17-19, 2015, Subotica, Serbia; pp. 101-106 (Year: 2015).*

* cited by examiner r1
r2
r3
<a1
<a2
<a3
<a4
22
C1
C2

70000
60000
50000
40000
30000
20000
10000
0
Area FOM
gradient boost 1
gradient boost 2
iris rfc
iris bag
digits rfc
vow boost
vow rfc
wine rfc
Parallel
Serial
SortComp 17
18
rank [1]
LUT [1]
tmp_result [1]
rank [i]
LUT [i]
tmp_result [i]
rank [I]
LUT [I]
tmp_result [I]
Combiner Logic
w [1]
vote [1]
w [m]
vote [m]
w [M]
vote [M]
< c_thr
Result class 17
18
rank [l]
LUT [l]
LSB
MSB
p [1] Bit wide
p [q] Bit wide
p [Q] Bit wide
tmp_result [l] X bits wide total
c [l][1]
c [l][q]
c [l][Q]
tmp_results from other LUTs
c [1][1]
c [1][q]
c [1][Q]
common to all LUTs
s [1]
s [q]
s [Q]
< st [1]
< st [q]
< st [Q]
v [1]
v [q]
v [Q]
k [1] Bit
k [q] Bit
k [Q] Bit
g [1]
g [m]
g [M]
w [1]
w [m]
w [M]
c_sum
>=c_thr
class
(weighted) majority vote tmp_result [1...l][p[1]]
7 Bit
3 Bit
LSB
4 Bit
"0"
3 Bit
cfg_mux [x+1]
cfg_mux [x]
v [q=1]
s [q=1]
Relevant Results (Incices q in Fig. 10)
Circuit corresponding to one Column/Bit in tmp_result
tmp_result [1...l][x-1]
MSB
cfg_mux [x-1]
v [x-1]
s [x-1]
Irrelevant Results (v, s not in Fig.10)
tmp_result [1][1]
tmp [i][1]
tmp [l][1]
cfg_mux [1]
v [x=1]
s [x=1]
Irrelevant Results (v, s not in Fig.10)

HARDWARE ACCELERATOR FOR DECISION TREE ENSEMBLE USING RANK-BASED THRESHOLD EVALUATION WITH FEATURE-GROUPED MEMORY

This patent application is a national phase filing under section 371 of PCT/EP20021/066411, filed Jun. 17, 2021, which claims the priority of German patent application 102020116293.6, filed Jun. 19, 2020, each of which is incorporated herein by reference in its entirety.

TECHNICAL FIELD

This disclosure relates to an architecture for classification of a decision tree ensemble and method.

BACKGROUND

Random forest, RF, or Decision tree ensembles, or DTEs for short, are used for various classification tasks in both hardware and software. DTEs are intuitively evaluated by serially traversing each tree separately and then aggregating each tree output by averaging or majority vote. A different approach is to compute all node comparisons in parallel and translate the trees into a Boolean function that computes the tree output for aggregation or directly computes the aggregated output.

DTEs can be trained by machine learning algorithms like random forest, AdaBoost, or gradient boosted trees. An architecture for classification of a decision tree ensemble can be constructed as a hardware architecture for the inference of DTEs in FPGA or ASIC technology. Such an architecture can be integrated into a variety of applications in the field of edge machine learning such as, but not limited to: smart sensors, wireless sensor networks, structural health monitoring, predictive maintenance, and healthcare.

Architectures for decision tree ensemble classification, or DTE hardware accelerators, usually consist of one tree processing unit per decision tree in the ensemble and an aggregation unit that computes the ensemble vote as shown in FIG. 13. Such a tree processing unit can also be used as a hardware accelerator for a single decision tree on its own.

FIG. 14A shows an example of a single classification tree. To predict the class for a new set of feature inputs, each node of the tree compares one of the features $f_i$ to the nodes threshold $t_j$. Starting at the root node, the results of the comparisons in the following nodes define a path through the tree, which ends in a leaf node. The tree votes for a class $C_x$ that corresponds to the reached leaf. All tree votes in an ensemble are then aggregated by majority voting to get the final vote of the tree ensemble. The index of the feature f that is compared by a node, the threshold values t, the class labels C at the leaf nodes, and the structure of the tree are parameters defined by the training.

Two types of architecture are widely used to implement decision trees. Basically, a serial architecture stores all parameters of the decision tree in the memory and evaluates it from root to leaf. A parallel architecture has one comparator for each node and evaluates the whole tree at once. In more detail, serial architectures, as depicted in FIG. 14B, traverse the decision trees of a trained model from the root to the leaf node. In each node, it fetches the feature input and the threshold of the given node from a memory or an input multiplexer. It then compares the two and selects either the left or the right child address as the next node to visit. It does this until it reaches a leaf node and outputs the corresponding class vote. Parallel architectures, as illustrated in FIG. 14C, compute all node comparisons of the tree at once. Each comparator represents one tree node. The thresholds are stored in a register with the comparator, which is wired to a feature input according to the node it represents. The tree vote is computed from the comparator outputs by a Boolean function that represents the tree structure. The Boolean function is specific to the trained model and can be derived from a tree as follows.

A classification tree from an DTE can be mathematically represented as a rooted, directed, acyclic graph DT=(V, D, E, C), with the following notation:

V a set of vertices $V=N \cup L$, where L is a set of leaf nodes and N is a set of internal nodes containing a threshold $$t_i^j,$$

which corresponds to one of the features $f_i$,

D a set of Boolean variables $d_x$ defined by the node comparison $$d_x := f_i < t_i^j$$

for each node $v_x \in N$,

E a set of edges $(v_x, v_y)$, with $v_x, v_y \in \{V\}$ labeled by $F_E$: $E \rightarrow \{0,1\}$ to define on which result of $d_x$ the edge is taken when processing the tree, and C a set of classes, which are assigned to the leaf nodes by $F_C$: $L \rightarrow C$.

For each class $c \in C$ a set of paths $P_c=\{p_{c,1}, p_{c,2}, \ldots, p_{c,K}\}$ is defined by $$p_{c,k}=\{v_{k,1}, v_{k,2}, \ldots, v_{k,J}\}$$

for k=1, . . . , K, with $v_{k,m} \in V$, $v^{k,1}$ is the root node $(v_{k,m}, v_{k,m+1}) \in E$ for m=1, . . . , $M_k-1$, $M_k=|p_{c,k}|$ and $v_{k,M} \in L$ with $F_C(v_{k,M})=c$.

The parallel architecture in FIG. 14C implements each node as a fixed comparator. The tree structure can be formalized as a Boolean function $F_{DT,c}$: $D \rightarrow \{0,1\}$ that computes the tree vote for a class c from the comparator outputs. The Boolean function can be expressed as:

$$F_{DT,c} = \bigvee_{k=1}^{K} \bigwedge_{m=1}^{M_k-1} \tilde{d}_{k,m}, \text{ with}$$

$$\tilde{d}_{k,m} = \begin{cases} d_{k,m} & \text{if } F_E((v_{k,m}, v_{k,m+1})) = 1 \\ \overline{d}_{k,m} & \text{if } F_E((v_{k,m}, v_{k,m+1})) = 0 \end{cases}$$

and $v_{k,m}, v_{k,m+1} \in p_{c,k}$.

For example, the tree depicted in FIG. 14C (2) results in $$F_{DT}(C_1)=d_1 \wedge d_2 \wedge \overline{d}_4 \vee d_1 \wedge \overline{d}_3$$

and $$F_{DT}(C_2)=d_1 \wedge d_2 \wedge d_4 \vee d_1 \wedge \overline{d}_2 \vee \overline{d}_1 \wedge d_3.$$

Both serial and parallel architectures, however, leave room for improvements.

SUMMARY

Embodiments provide an architecture for classification of a decision tree ensemble and a method for classification of a decision tree ensemble which improves on decision tree ensemble classification architecture, e.g., in terms of speed, energy consumption and/or area.

It is to be understood that any feature described in relation to any one embodiment may be used alone, or in combination with other features described herein, and may also be used in combination with one or more features of any other of the embodiments, or any combination of any other of the embodiments unless described as an alternative. Furthermore, equivalents and modifications not described below may also be employed without departing from the scope of the architecture for classification of a decision tree ensemble and the method for classification of a decision tree ensemble, which are defined in the accompanying claims.

The following relates to an improved concept in the field of classification of decision tree ensembles. The proposed concept suggests an architecture and method for solving the inference of classification and regression trees and decision tree ensembles, DTEs for short. The proposed concept can be implemented based on a hardware architecture, e.g. in FPGA or ASIC technology. However, the method may also be implemented in software.

The proposed concept suggests a grouping and pre-sorting of thresholds of all comparisons of a given decision tree ensemble to quickly compute all nodes using a logic, such as a binary search or an in-memory search. Furthermore, the architecture can be complemented with lookup tables which hold precomputed entries to further speed up classification.

In at least one embodiment an architecture for classification of a decision tree ensemble comprises a rank computing block and a tree processing block. The rank computing block comprises one computation unit per feature from a set of features to be classified. Each computation unit comprises a memory and a logic. The memory is configured to save threshold values of the trees in the decision tree ensemble. The memory is configured to save the threshold values in one group per feature. Furthermore, the threshold values in a group are pre-sorted according to a threshold index, to allow for efficient search algorithms, such as binary search. The threshold index allows to define a search criterion, such as "<" or ">".

The logic is arranged to conduct a comparison of the threshold values of a corresponding group of threshold values and output a rank of an assessed feature value. A rank represents an encoded address which is representative of a threshold value. The tree processing block is configured to determine a class of the set of features to be classified as a function of ranks. For example, in some embodiments the tree processing block comprises one tree processing unit per tree in the decision tree ensemble. Each processing unit is configured to determine a class of the set of features to be classified as a function of ranks. In other embodiments there may only be one tree processing unit, which comprises a number of look-up tables and a combiner, as will be discussed in further detail below.

Preliminary results show that the new architecture can keep up with hardware cost and energy efficiency of both serial and parallel architecture, which only excel in one of the two figures of merit, respectively. The ranks can be used for further processing by means of the tree processing block as they hold the same information as the computed comparisons of all nodes.

In at least one embodiment feature from the set of features to be classified are denoted as $f_i$, with feature index $i \in [1;I]$, wherein I denotes the number of features to be classified. The threshold values are representative of nodes of trees in the decision tree ensemble.

The logic is arranged to receive a set of features $f_i$ to be classified and to conduct a search which returns the rank for each feature that splits the thresholds into values less and greater than the feature. The ranks are output to the corresponding tree processing units, for example. Finally, the tree processing units are configured to determine the classes by evaluating Boolean functions, which each are representative of the structure of a decision tree in the decision tree ensemble, as a function of the received ranks, respectively. Alternatively, the ranks are output to the corresponding look-up tables.

In at least one embodiment the tree processing block comprises an aggregation unit which is arranged to receive the determined classes from the tree processing units and to form an ensemble vote as a function of the determined classes.

In at least one embodiment of the memory the memory comprises one group of memory cells for each feature from the set of features to be classified. The memory cells within a group are addressable according to a threshold index.

In at least one embodiment the logic comprises a comparator which further comprises a first input operable to receive a feature and a second input, which is operable to receive a threshold value from the memory.

In at least one embodiment the tree processing unit comprises one or more comparators which are arranged to perform an address decoding of the received ranks to evaluate the Boolean functions based on address decoded ranks. The comparator is operable to conduct a comparison based on ranks, which are a representation of node comparisons of threshold values of a corresponding group of threshold values. In a sense, the ranks are decoded to conduct an address comparison.

In at least one embodiment each of the computation units from the rank computing block is connected to a dedicated lookup table, respectively. The lookup tables comprise an input side which is operable to receive a dedicated rank from the computation unit connected to the lookup table. Furthermore, the lookup tables are operable to output intermediate values such as a function of the input ranks.

In at least one embodiment each of the tree processing units may be connected to a dedicated lookup table. The lookup table comprises an output side which is arranged to provide an intermediate value to the tree processing unit which is connected to the lookup table. The tree processing units are operable to determine the class of the set of features to be classified as a function of the received intermediate values.

In other embodiment, there may no longer be a dedicated lookup table for each of the tree processing units. Rather, the lookup tables may be considered as part of the tree processing block and may be complemented with a combiner. Contents corresponding to the tree structures are stored for all trees combined in one lookup table per feature. The lookup table entries correspond to a possible configuration, and, together with the combiner form the tree processing block. However, several trees can also be combined internally into a "sub-ensemble".

In at least one embodiment the architecture further comprises a combiner with an arithmetic unit. The combiner is operable to receive the intermediate values and is operable to combine and/or weight the intermediate values and to output the class of the feature to be classified. The combiner can be implemented as a common unit for all trees or sub-ensembles.

In at least one embodiment the lookup tables are implemented based on an associative memory comprising one or more comparators which are operable to conduct a "less than" or "greater than" comparison.

In at least one embodiment, a method of classification of a decision tree ensemble comprises the following steps. First threshold values of the decision trees in the decision tree ensemble are saved into one group per feature to be classified. The threshold values of a group are sorted according to a threshold index. A node comparison of the threshold values of a corresponding group of threshold values is conducted. A rank is output as a result of the node comparison, wherein a rank represents an encoded address to assess said threshold value. Finally, a class is determined of the set of features to be classified as a function of ranks.

In at least one embodiment the features from the set of features to be classified are denoted as $f_i$, with feature index $i \in [1;I]$, wherein I denotes the number of features to be classified. The threshold values are representative of nodes of trees in the decision tree ensemble. The method comprises the further step of receiving a feature to be classified by means of a logic and, using the logic, conducting a search which returns the rank for each feature that splits the threshold values into values less and greater than the feature value. The ranks are output to a corresponding tree processing unit, respectively. The classes of the feature to be classified are determined by evaluating Boolean functions, each being representative of a tree in the decision tree ensemble as a function of received ranks, respectively.

In at least one embodiment the ranks are determined from a binary search using the logic. Alternatively, the ranks are determined from an in-memory search.

In at least one embodiment the evaluation of the decision trees involves a lookup table filled with pre-calculated values which are saved as lookup table entries and wherein the classes are determined depending on the lookup table entries.

In at least one embodiment the lookup table entries are determined by training software. The training software determines an assignment of look-up table entries, such that both the mathematical description of a classification architecture and of the DTE are equivalent.

The following description of figures of example embodiments may further illustrate and explain aspects of the improved concept. Components and parts with the same structure and the same effect, respectively, appear with equivalent reference symbols. Insofar as components and parts correspond to one another in terms of their function in different figures, the description thereof is not necessarily repeated for each of the following figures.

BRIEF DESCRIPTION OF THE DRAWINGS

Further aspects, features and advantages will be readily apparent from the following detailed description, the accompanying drawings, and the claims.

In the Figures.

DETAILED DESCRIPTION OF ILLUSTRATIVE EMBODIMENTS

Figure 1:
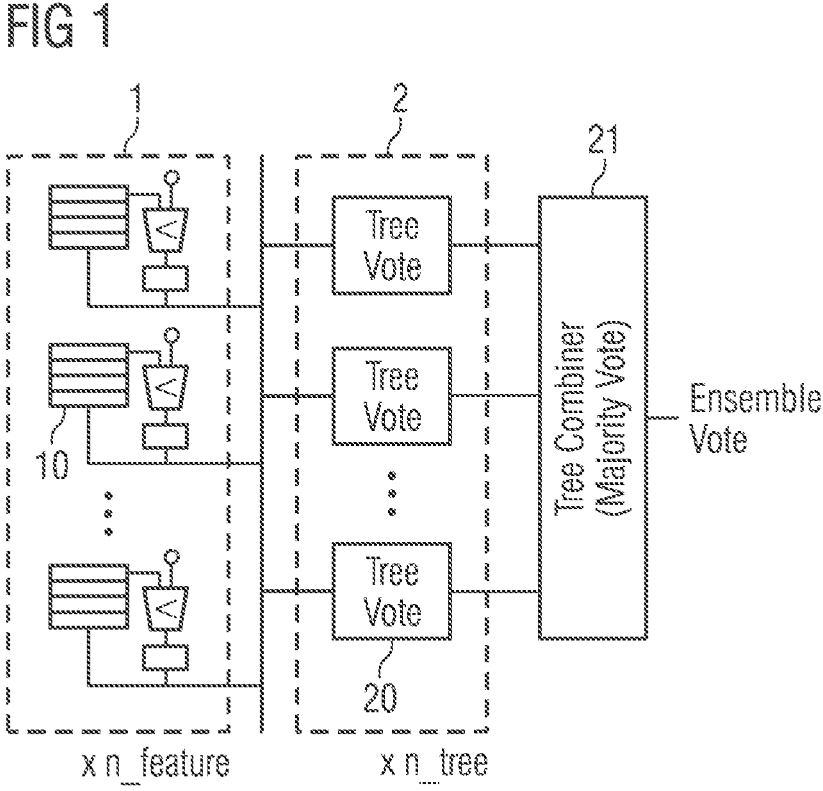
FIG. 1 shows an example top-level diagram of an architecture for classification of a decision tree ensemble.

FIG. 1 shows an example top-level diagram of an architecture for classification of a decision tree ensemble. The architecture comprises a rank computing block 1 and a tree processing block 2. The rank computing block 1 comprises a number of computation units 10. In fact, there is one dedicated computation unit per feature $f_i$ to be classified (the index i or feature index denoted an integer number of I features which are to be classified). Each computation unit further comprises a memory 11 and a logic 12.

The memory 11 comprises a plurality of memory cells and is configured to save a number of threshold values according to decision trees from a decision tree ensemble. In other words, memory saves the threshold values of the trees which are characteristic of the decision tree ensemble. The threshold values are grouped into feature groups as will be discussed in more detail below. Basically, the memory comprises one group of threshold values per feature to be classified. The threshold values in a group are sorted according to a threshold index. The logic 12 allows to access the threshold values of a corresponding group of threshold values. According to the process further discussed below the logic outputs a rank of an accessed threshold value. A rank represents a encoded address to access said threshold value and, in turn, is representative of the threshold value.

The tree processing block 2 comprises one tree processing unit 20 per tree in the decision tree ensemble. The tree processing unit are arranged to conduct a classification, or tree vote. In fact, each processing unit is configured to evaluate a Boolean function which is representative of a tree in the decision tree ensemble as a function of ranks.

The Boolean function can be realized in soft logic on an FPGA or hardwired logic on an ASIC or using a scheme discussed further below. The ranks are received from the rank computing block and the corresponding computation units. The tree processing block further comprises an aggregation unit 21 (or tree combiner). This unit receives the votes (or classifications) from the tree processing units and forms an ensemble vote thereof. In other words, the aggregation unit performs a majority vote.

Figure 2:
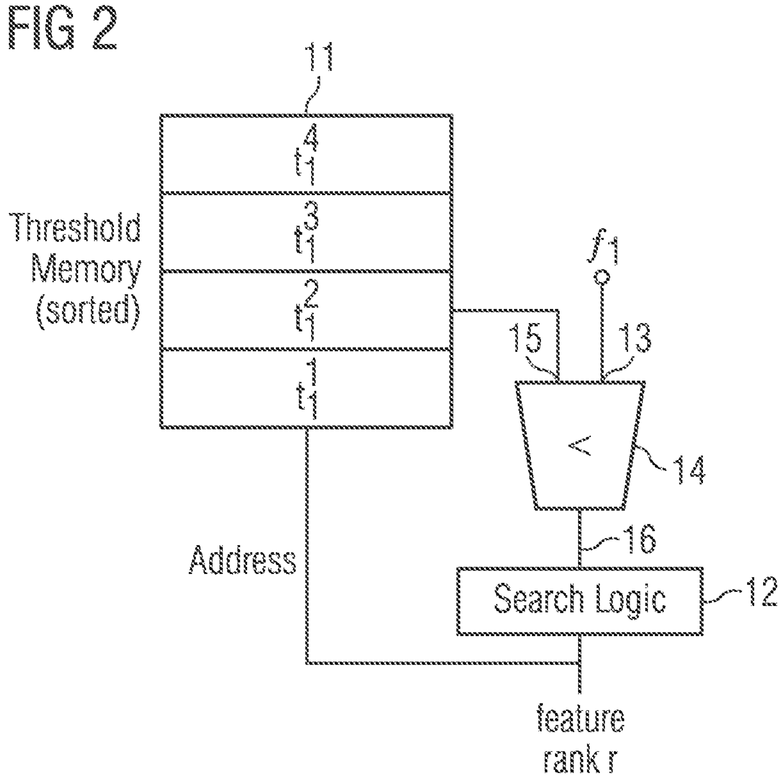
FIG. 2 shows an example embodiment of a computation unit.

FIG. 2 shows an example embodiment of a computation unit in more detail. The memory 11 comprises a number of memory cells each of which have a unique address. The drawing indicates that the memory holds threshold values, which are sorted according to a threshold index. The threshold values, which are saved in the memory, belong to dedicated groups, which correlate with a corresponding feature ($f_1$ in this example). The feature can be input via an input side 13 of a comparator 14 (indicated by "<" in the drawing). Another input 15 is arranged to access and thereby receive the threshold values from the memory. This way the comparator may conduct a comparison of the feature associated with the dedicated group according to the tree definition ($f_1$ in this example). Furthermore, the logic 12 is arranged to access the comparator 14 via another input side 16. As a consequence of this control, the comparator compares the input feature with the threshold values. The memory outputs corresponding encoded addresses which, in turn, are indicative of the threshold/feature comparisons (or tree nodes). The ranks can be used for further processing by means of the tree processing block as they hold the same information as the computed comparisons of all nodes.

In conclusion, similar to a serial architecture, the computation unit comprises a comparator and a memory. The memory, however, contains one threshold group instead of one complete decision tree. The comparator 14 is only connected to the corresponding features, thus eliminating the complexity of an input multiplexer, which is typically demanded in other architectures. Furthermore, the memory contains only the thresholds and no tree structure information like feature indices or child addresses, which greatly reduces the memory size. For example, the search logic performs a binary search to quickly compare the input feature to the thresholds.

Figure 3:
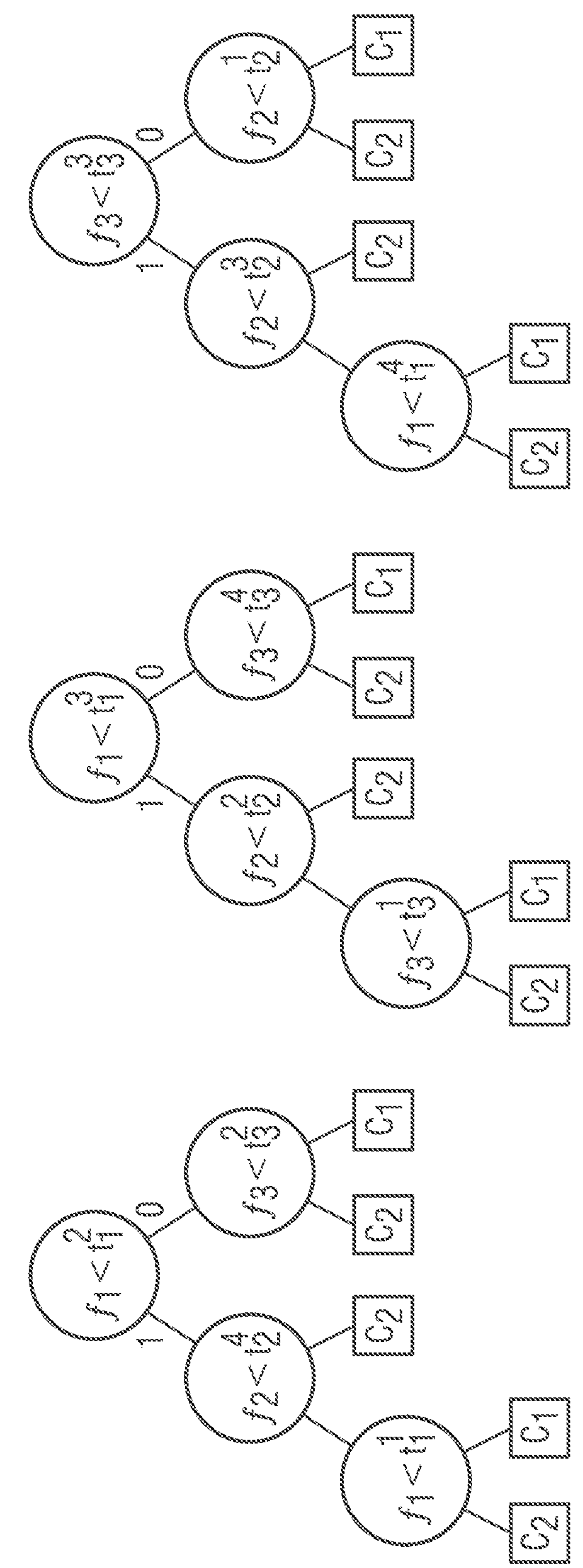
FIG. 3 shows an example decision tree ensemble to illustrate a grouping and pre-sorting scheme.

FIG. 3 shows an example decision tree ensemble to illustrate a grouping and pre-sorting scheme. The proposed concept is based on pre-sorting the threshold values, e.g. to speed up the comparisons. The drawings shows an example on how the thresholds can be grouped and sorted. The drawing depicts three example decision trees including features $f_1$, $f_2$, and $f_3$, as well as the two example classes $C_1$ and $C_2$. A tree node is considered a comparison between a threshold $$t_i^j,$$

with threshold index j and a corresponding input feature $f_i$, with feature index i. The thresholds of all decision trees in the ensemble can be grouped by the according feature index of each node. The resulting example groups of thresholds by feature are shown in Table 1. The threshold values $$t_i^j$$

can be sorted according to a sorting criterion, e.g. as $$t_i^j < t_i^{j+1}.$$

The logic 12 can be arranged to exploit this sorting criterion to conduct a fast search operation. The resulting example of sorted groups is shown in Table 2.

TABLE 1

| group thresholds by feature | | |
|---|---|---|
| $f_1$ | $f_2$ | $f_3$ |
| $t_1^2$ | $t_2^4$ | $t_3^2$ |
| $t_1^1$ | $t_2^2$ | $t_3^1$ |
| $t_1^3$ | $t_2^3$ | $t_3^4$ |
| $t_1^4$ | $t_2^1$ | $t_3^3$ |

TABLE 2

| sorted groups by feature | | |
|---|---|---|
| $f_1$ | $f_2$ | $f_3$ |
| $t_1^2$ | $t_2^4$ | $t_3^2$ |
| $t_1^1$ | $t_2^2$ | $t_3^1$ |
| $t_1^3$ | $t_2^3$ | $t_3^4$ |
| $t_1^4$ | $t_2^1$ | $t_3^3$ |

The resulting threshold groups are individually sorted by the thresholds values, where the sorting criterion, e.g.

$$t_i^j < t_i^{j+1}$$

enables fast searching methods like a binary search. Instead of serially traversing the trees or computing all nodes, the DTE can be evaluated by performing a binary search for each feature in the corresponding threshold group. The binary search results in an address (i.e., the rank) for each feature that splits the thresholds into values less and greater than the feature. These addresses, the ranks of the features, hold the same information as the computed comparisons of all nodes. Hence, the tree vote can be computed by a Boolean function as is done in the parallel architecture, for example, while requiring far less comparisons.

The complete architecture comprises one computation unit per feature and one tree vote function per tree and, optionally, an aggregation unit to form an ensemble as shown in FIG. 1. The tree vote function has similarities with the parallel architecture. The input, however, is an encoded address, whereas the parallel architecture encodes each comparison in one bit. Thus, the tree vote function of the parallel architecture is extended to a different Boolean function. Using the nomenclature introduced above in the introduction part of this disclosure, the tree structure can be formalized as a Boolean function $$F_{DT,c}^{SC} R \to \{0,1\}$$

that computes the tree vote for a class c from the comparator outputs or ranks R. The Boolean function can be expressed as:

$$F_{DT,c}^{SC} = \bigvee_{k=1}^{K} \bigwedge_{m=1}^{M_k-1} \tilde{d}_{k,m}^{SC}$$

$$\tilde{d}_{k,m}^{SC} = r_{k,m} < a_{k,m}$$

$$\tilde{d}_{k,m}^{SC} = \begin{cases} d_{k,m}^{SC} & \text{if } F_E((v_{k,m}, v_{k,m+1})) = 1 \\ \overline{d}_{k,m}^{SC} & \text{if } F_E((v_{k,m}, v_{k,m+1})) = 0 \end{cases}$$

and $v_{k,m}, v_{k,m+1} \in p_{c,k}$.

Here $r_{k,m}$ denotes the computed rank of the feature used in node $v_{k,m}$ and $a_{k,m}$ is the address of the threshold of node $v_{k,m}$ in the pre-sorted dedicated threshold group.

Figure 4:
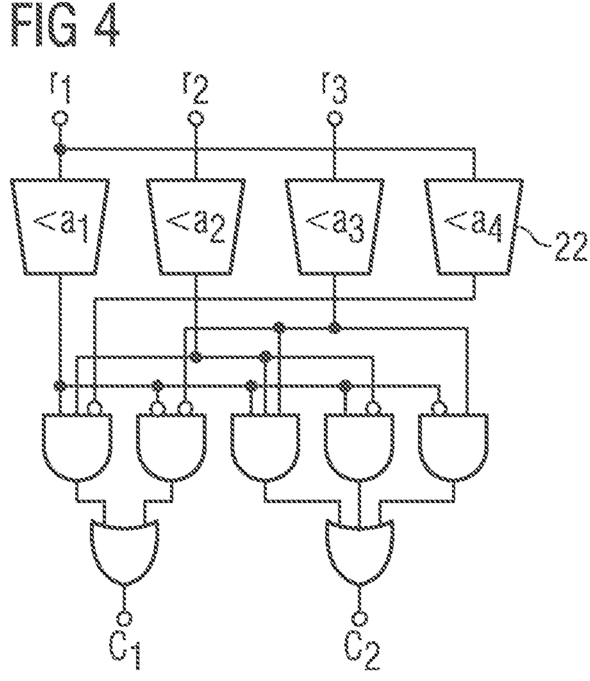
FIG. 4 shows an example embodiment of a computation unit.

FIG. 4 shows an example embodiment of a computation unit.

Figure 14A:
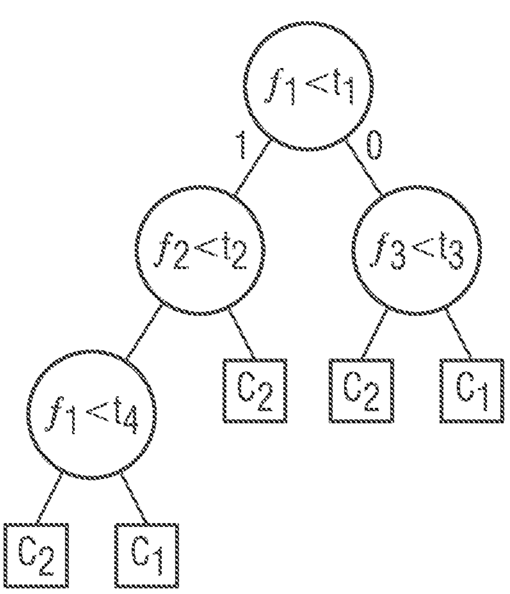
FIGS. 14A-14C show examples of classification concepts.
Figure 14B:
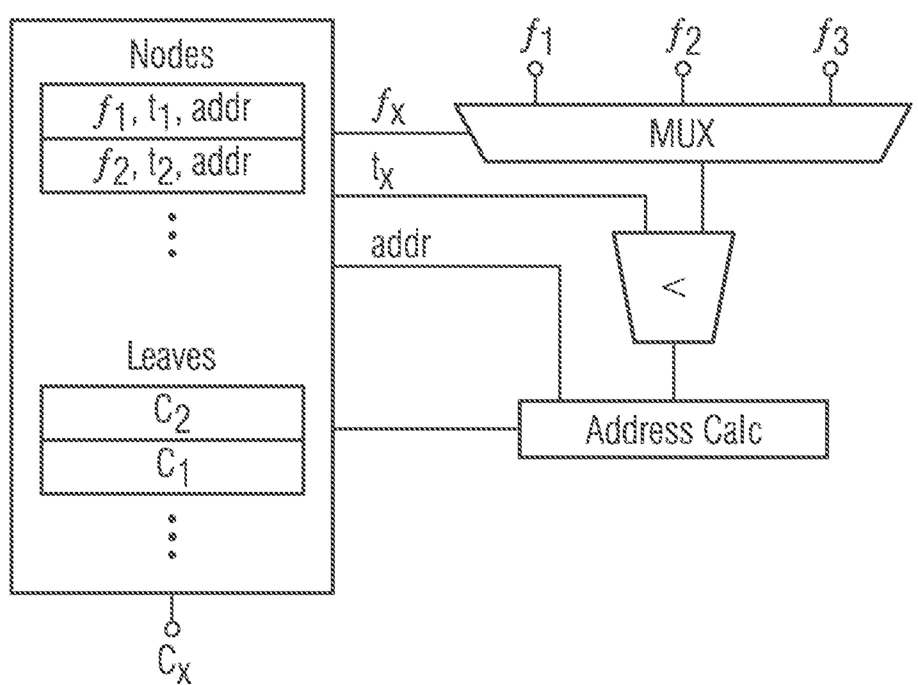
Figure 14C:
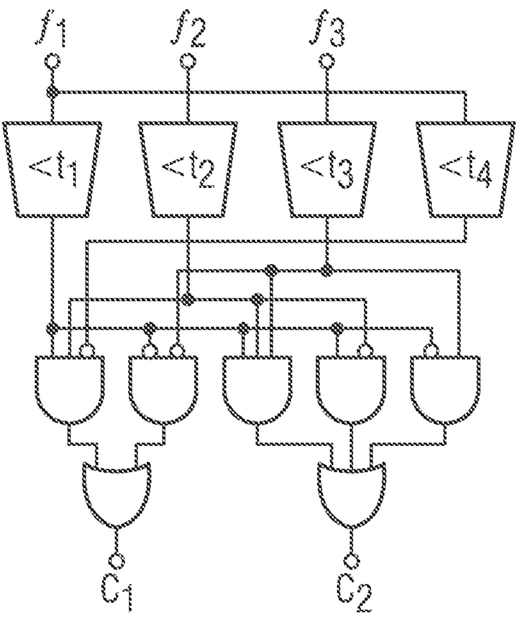

The rank computing blocks provide a number of corresponding ranks which are input to the tree processing block 2, i.e. to the computational unit to vote a corresponding class. One implementation of a computational unit is similar to the parallel architecture as shown in FIG. 14. The computational unit comprises one comparator 22 for each tree node. However, the comparators in the proposed concept decode the rank addresses and do not perform the actual node comparison. Actually, the addresses represent the comparison and can be used directly in the computation of the Boolean function instead. The address decoding can be minimized, e.g. with the tree vote function by synthesis tools when mapped to FPGA or ASIC technology.

Some benefits of the proposed concept include:

- The memory only needs to contain the threshold values of the corresponding feature. The feature index and child addresses of a node do not need to be stored, which greatly reduces the memory usage.
- Duplicates in the grouped thresholds can be removed as they bring no additional information to the accessing of the memory, e.g. by means of a binary search. This allows to decrease memory size and memory access energy even further.
- Compared to the serial architecture, the feature input does not need to be fetched from the memory or an input multiplexer. This reduces the circuit complexity and energy consumption.
- Decision trees are generally not balanced which may result in different execution times for different decisions. This makes parallelization between the trees more difficult and requires synchronization. The proposed concept suggest to search through the thresholds in a balanced fashion, using binary search, for example, thus, reducing circuit complexity and execution time. Although execution time may vary from tree to tree, it can be adjusted by introducing parallelism into the search comparison so it may stay constant from decision to decision.
- The binary search performs far less comparisons than the parallel architecture, which computes all of them. In some cases, the binary search even computes less comparisons than the serial architecture, especially when long branches occur in the tree. This reduces execution time and energy or circuit size, depending on the amount of parallelization.

The benefits discussed above can also be seen in experimental results. To compare the number of comparisons against the serial and parallel architectures, two models have been trained on different datasets and statistically analyzed using the corresponding test dataset. For the parallel architecture, the number of comparisons simply is the number of nodes in all trees. For the serial architecture, the tree iteration is performed on real test data to estimate the number of comparisons per inference statistically. Similarly, the binary search is performed on the test data to get the numbers for the proposed architecture.

Table 1 shows the statistical or exact number of comparisons for two models trained on different datasets. Since the execution time of the serial architecture is irregular because of the unbalanced trees, the table contains (min, mean, max) tuples.

TABLE 3

Numbers of comparisons for example architectures and two different datasets.

| | parallel | serial | proposed |
|---|---|---|---|
| dataset 1 | 1573 | (76, 285, 490) | 181 |
| dataset 2 | 631 | (63, 126, 110) | 35 |

To compare the hardware area and the energy consumption of the architectures, three of them where implemented in SystemVerilog and synthesized for a commercial FPGA. The hardware area figure of merit (FOM) is defined as FF+2·LUT based on the Flip Flop (FF) and Look-up-Table (LUT) resources after synthesis. The energy consumption is estimated using a power estimation tool from the FPGA vendor and based on switching activity that is simulated with real test data classifications.

Figure 5:
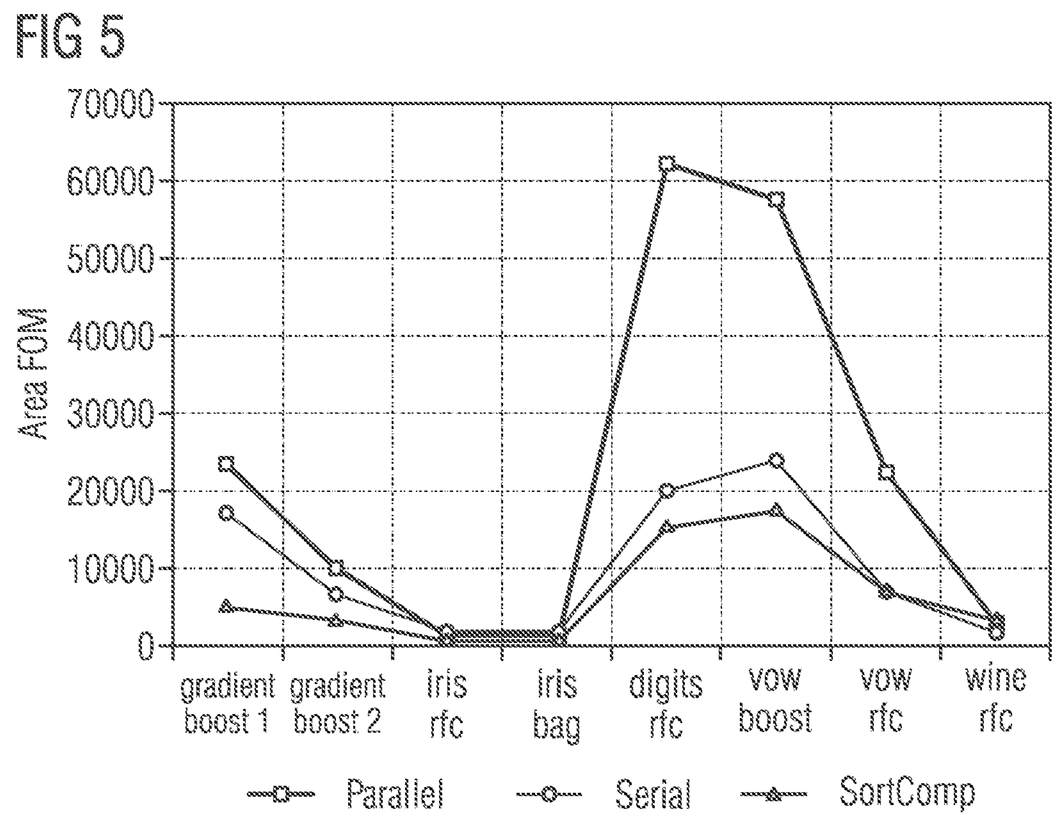
FIG. 5 shows the size FOM of example architectures for several models trained on different datasets using different training algorithms.
Figure 6:
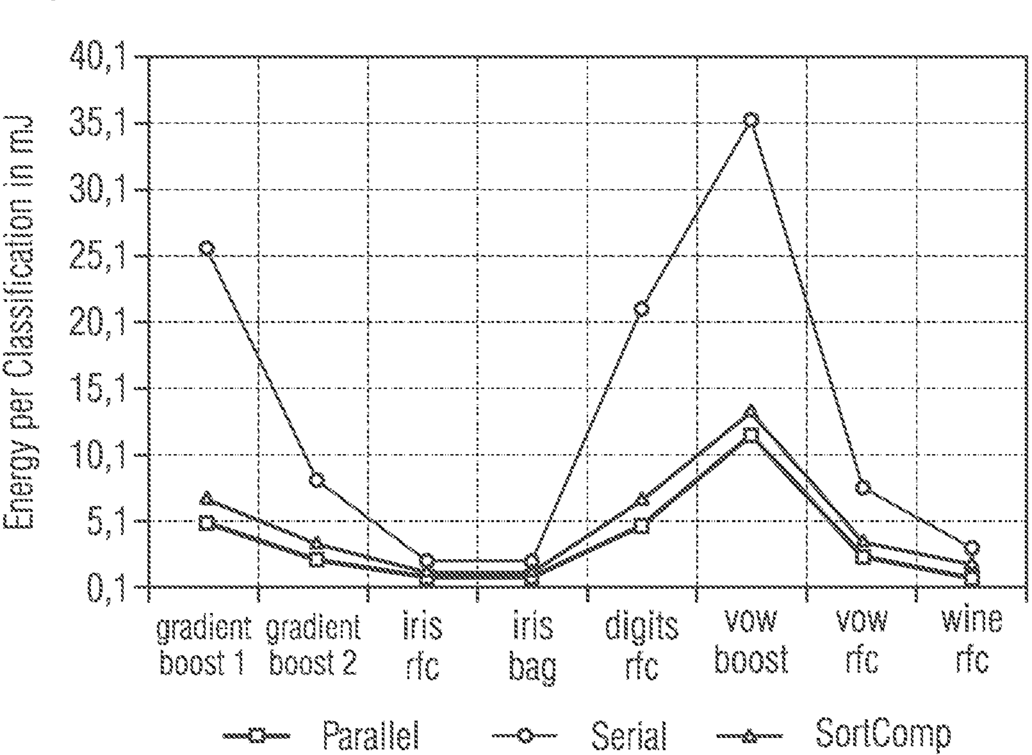
FIG. 6 shows the energy comparison of example architectures for several models trained on different datasets using different training algorithms.

FIGS. 5 and 6 show the size FOM and energy comparison of all three architectures for several models trained on different datasets. The results clearly show that the new architecture performs well in both figures of merit and even outperforms the serial architecture in the size FOM for most datasets. On the other hand, the serial architecture shows the worst energy efficiency and the parallel architecture shows the worst performance in the size FOM. This makes the architecture widely usable and proves to be the best candidate for tuning the trade-off between size and energy by introducing parallelization.

Figure 7:
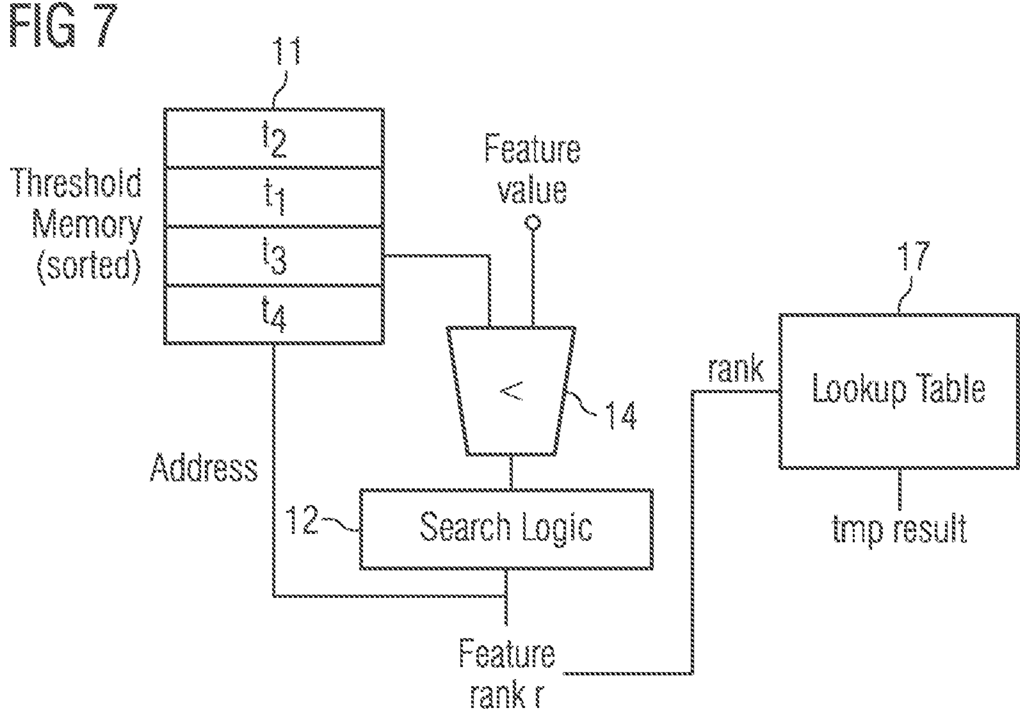
FIG. 7 shows another example embodiment of a computation unit.

FIG. 7 shows another example embodiment of a computation unit. As discussed above, the rank computing block 1 provides a rank which is input to the tree processing block 2, i.e. to the computational unit 10 to evaluate or vote a class. By using the ranks, computational effort necessary to execute the evaluation of the decision trees by the feature values can be reduced compared to directly working on feature values. In fact, the computational steps can be carried out to calculate in advance and in a Lookup Table 17 (or LUT) to be kept available. Since a single LUT (whose input comprises of all features) may become very large, one LUT 17 per feature is used. As shown in the drawing, the LUTs receive the ranks from the rank computing block and output intermediate results tmp_results, The intermediate results can be processed by a comparatively simple structured arithmetic (or "combiner" 18) to process the final result of the classification.

This leads to decisive advantages compared to a more naive implementation, e.g. including high speed with considerably low energy requirements. The classification consists of a few parallel and independent memory accesses and a small one, energy-efficient and parallel arithmetic. The use of LUTs allows for high flexibility as the contents of the LUTs can be freely selected even in ASIC technology after fabrication. In addition, the structure of the hardware can be very uniform and complete reconfigurability of the combiner is possible. This allows arbitrary DTE models to be mapped.

Figures 8, 9:
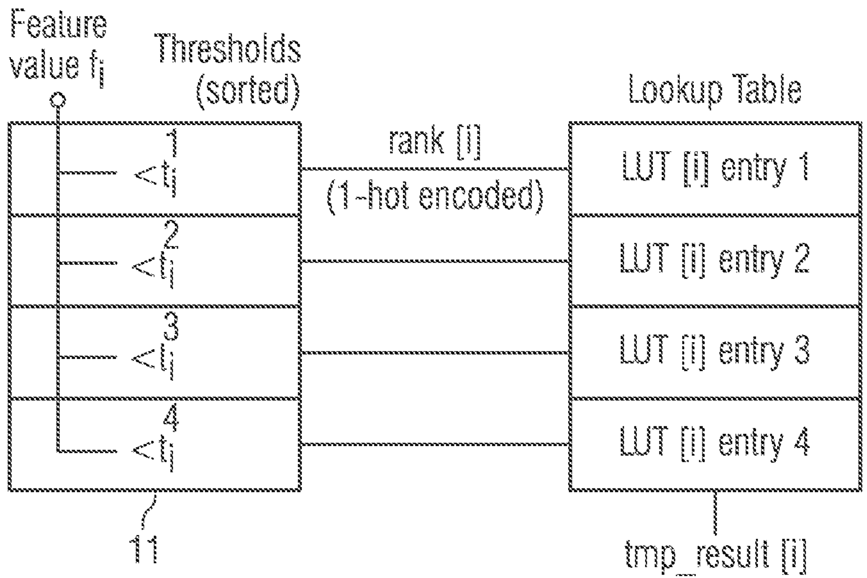
FIG. 8 shows calculating a classification result from ranks using a LUT.
FIG. 9 shows an example embodiment of a combined in-memory rank calculation and LUT lookup.

FIG. 8 shows an example embodiment the combiner for calculating a classification result from a LUT. The drawing can be used to demonstrate the LUT principle in a simplified or high level manner. A more detailed example implementation is described further below.

The combiner 18 comprises a plurality of lookup tables. In fact, there is one dedicated LUT to receive a corresponding rank, denoted rank[i] in the drawing. In other words, there is one dedicated LUT[i] for each feature i. The LUTs have trained entries for each value of the corresponding rank which result from a training procedure and which are representative of the structure and nodes of the respective decision tree. The LUTs output intermediate results tmp_result[i]. The intermediate results may be further processed in order to combine multiple features into tree votes and/or votes of sub-ensembles consisting of multiple trees. The votes may be further processed, e.g. weighted in a multiplier with respective weights, denoted w[m] where $m \in [1;M]$ and M is the total number of trees and/or sub-ensembles. An adder may combine the intermediate results (weighted or not) into a combined intermediate result. This result can be input into a comparator to conduct a comparison with a threshold value c_thr to come up with a classification result. The later parts starting from weighting may already be part of the aggregation unit.

In contrast to the example embodiments without additional LUTs, contents of the LUTs additionally need to be determined. The contents are determined according to a pre-determined criterion. For example, the contents (or LUT entries) shall represent an equivalent description of the hardware architecture. This way, the LUT entries may account for hardware, typically implemented as an ASIC, or changes in the set of features. The LUT entries are highly configurable and can be found by training based on a training model, e.g. using a solver software such as the open source software Z3 Theorem Prover. For example, on one hand, a description of the hardware structure and on the other hand a description of the DTE is input into the solver. The solver now finds an assignment of the entries in the LUTs LUT[i], where both descriptions are equivalent for all possible input assignments, i.e. the ranks or feature values.

The use of a solver, such as SMT/SAT solver, supports that the hardware implementation complies with the specified model and matches. The use of solvers for the calculation of LUT entries has already been described in the technically different field of logic synthesis in FPGAs. However, due to its high complexity, it is not used in practice. The proposed concept involves the use of solver software in the area of AI (Artificial Intelligence) and ML (Machine Learning).

By detaching from an explicit coding of the LUT content, the DTE model can be significantly compressed. Compared to the explicit assignment of the leaf nodes of all trees to each one output bit per LUT, compression rates of up to 400% have been achieved so far. Furthermore, the proposed architecture does not directly use the actual values of the features, but their ranks as addresses for the LUTs. In the trees of a DTE in each node, starting from the root, feature values are compared with trained thresholds. For each feature there are several threshold values that delimit intervals. The ultimately crucial information of the values is within which interval they lie in. If the threshold values are arranged in ascending or descending order according to the sorting criteria, as implemented in the rank computing block the index of an interval in which the feature value lies within, corresponds to its rank. The number of intervals is clearly lower than all possible values that a characteristic can assume. Thus also fewer bits are required for encoding. The bit width of the features or the feature rank corresponds to the bit width of the LUT address inputs. For example, if 16 bit features can be represented by 4 bit ranks the LUTs must consist of only 16 instead of 16384 entries. This reduction of the features to ranks is made possible by using the pre-sorting.

The described concept of a classifier hardware (combiner for calculating a classification result from a LUT intermediate) may further improve the proposed concept. The use of training, e.g. solvers such as SMT/SAT solvers, to calculate the contents of the LUTs beforehand provides improved results in terms of memory as well as circuit size. The use of ranks instead of the actual values of the features enables the reduction of memory sizes to a minimum. Furthermore, the combiner logic can be small and energy efficient despite its full reconfigurability. This way, there are no restrictions for the grouping of the LUT outputs and, thus, for the generation of the contents. Summation of groups of variable bit width and the simple comparison with threshold values are to be particularly emphasized.

FIG. 9 shows an example embodiment of an in-memory rank calculation. Although the near-memory calculation of the rank (i.e., based on binary search operation) described above is already very efficient and fast, there may be applications where it represents a possible bottleneck in the performance of the classifier hardware. An estimate of log 2 of the number of thresholds per feature (or corresponding bitwidth of the rank) clock cycles may be required. All other steps of the classification typically have a throughput of one classification per clock cycle through pipelining. Building on the comparator logic, additional concepts allow the calculation of the feature ranks in memory itself.

The drawing shows a computation unit 10 for a feature to be classified. The unit comprises a memory 11 for a given feature and grouped pre-sorted threshold values. Furthermore, the unit comprises a logic 12 which performs a comparison with the threshold values. Based on the comparison the logic outputs a rank not in binary, but 1-hot encoding which is then input into a corresponding lookup table. Instead of binary coding, there may be one line per possible state value. Only one line corresponding to the current rank is active ("hot"). Depending on the entries of the lookup table LUT entries, an intermediate result tmp_result is output by the computation unit.

The structure resembles that of an associative memory (Content Addressable Memory, CAM for short) complemented by the lookup table approach. However, in contrast to a regular CAM, the computation unit performs a comparison to "<" (or ">") instead of "=". This means that the match lines of all threshold memory cells with a value less (or greater) than the applied feature value are asserted. This implements a thermometer-encoding of the rank. The limit to the next larger (or less) threshold value can be determined from the thermometer-encoding and converted into 1-hot encoding by an inverter-and-gate per memory row. The result can be used directly as a word line for the LUTs, for example.

A large part of the periphery (e.g. an external search logic, an address decoder for the LUT memory) is no longer needed in this example embodiment. Since the memory is also used for read-only, the memory cells can be optimized for leakage current (e.g. by the use of Schmitt trigger structures or an ULP diode) and readout performance. A Write operation is only necessary to initialize the contents. This also enables the use of NVRAM or ROM to increase power and area efficiency. In addition to the performance gain on a per-clock rank calculation, additional power and area can be saved. Instead of the logarithmic number of memory accesses for the binary search, only one access is necessary. For this also no address decoders, or the like, are necessary, but the energy consumption of the match lines is added. This is presumably in similar areas to that of the periphery, so that ultimately a similar energy consumption per access occurs.

Figure 10:
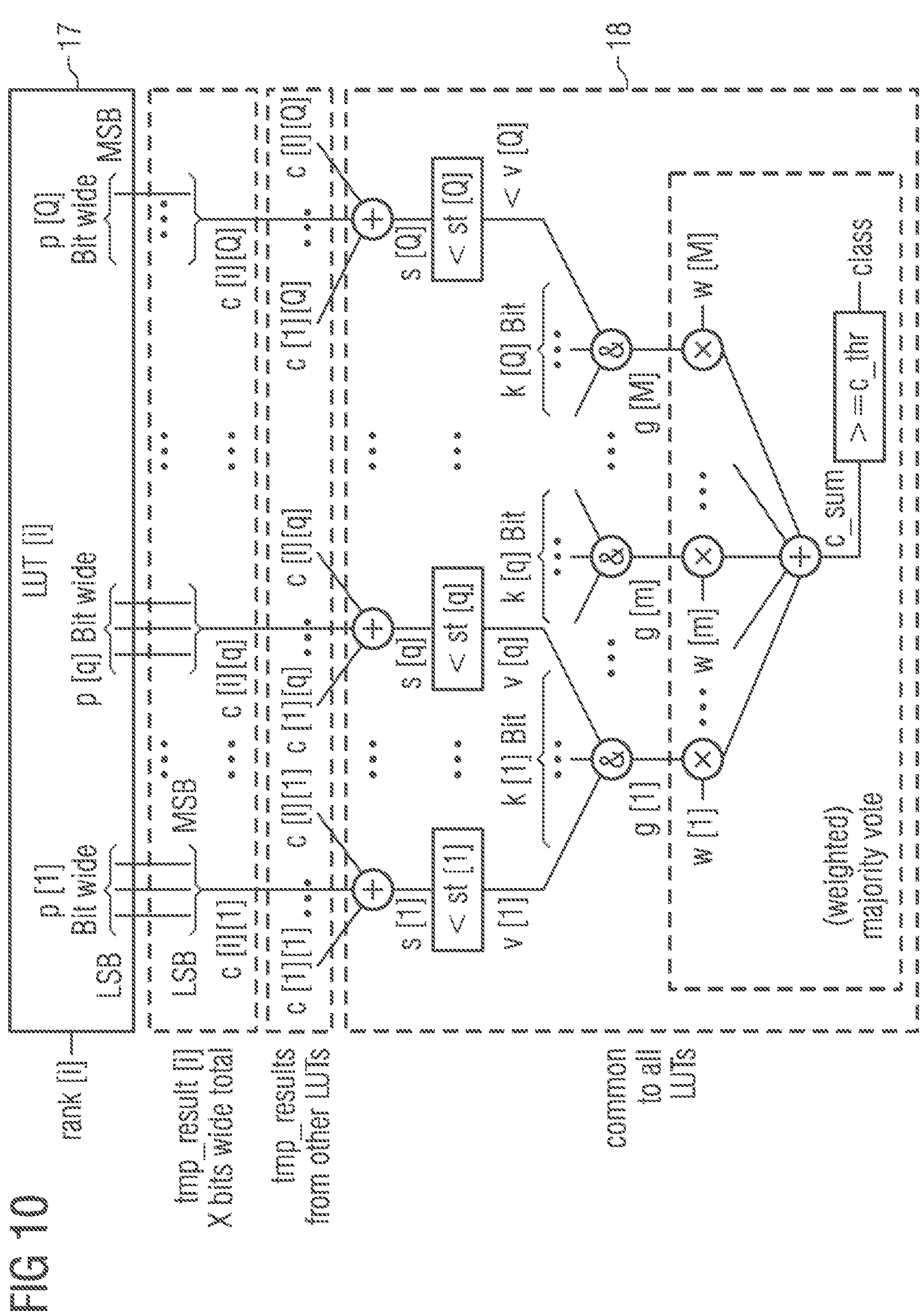
FIG. 10 shows calculating a classification result from LUT entries.

FIG. 10 shows another example embodiment the combiner for calculating a classification result from a LUT. The simplified structure of the combiner shown in FIG. 8 is described in more detail with respect to one possible implementation. As can be seen here complexity is somewhat higher, but the structure is still very regular and fully reconfigurable.

Depicted is one LUT[i] which is dedicated to a rank[i]. The individual bits of the intermediate LUT results are named tmp_result[i][x] with $x\in[1; X]$ and X being the total bitwidth of the LUTs. These individual bits tmp_result[i][x] are contiguously combined into Q non-overlapping binary values c[i][q] of configurable bit width p[q], with $q\in[1; Q]$ being the indices of the Q individual values. These binary values c[i][q] are added up across all features, i.e. $f_i$ with $i\in[1; I]$, to result in the sums $$s[q]=\sum_{i=1}^{I}c[i][q].$$

The sums s[q] are then compared with corresponding sum-threshold values st[q], i.e. v[q]=s[q]<st[q]. The comparison results v[q] are combined into M group votes $g[m]=\bigwedge_{q\in k[m]} v[q]$, $m\in[1; M]$ by AND-reduction over the contiguous, non-overlapping groups $k[m]\subseteq[1; Q]$, $m\in[1; M]$, of configurable size. The results of these groups may correspond to the votes of individual trees and/or sub-ensembles of the whole DTE. The group votes g[m] may be scaled by adjustable weights w[m] and summed up $$\text{c\_sum}=\sum_{m=1}^{M}g[m]\cdot w[m].$$

Which class a record ultimately belongs to is determined by a threshold value c_thr, such as class=c_sum≥c_thr. The later parts starting from weighting may already be part of the aggregation unit.

Figure 11:
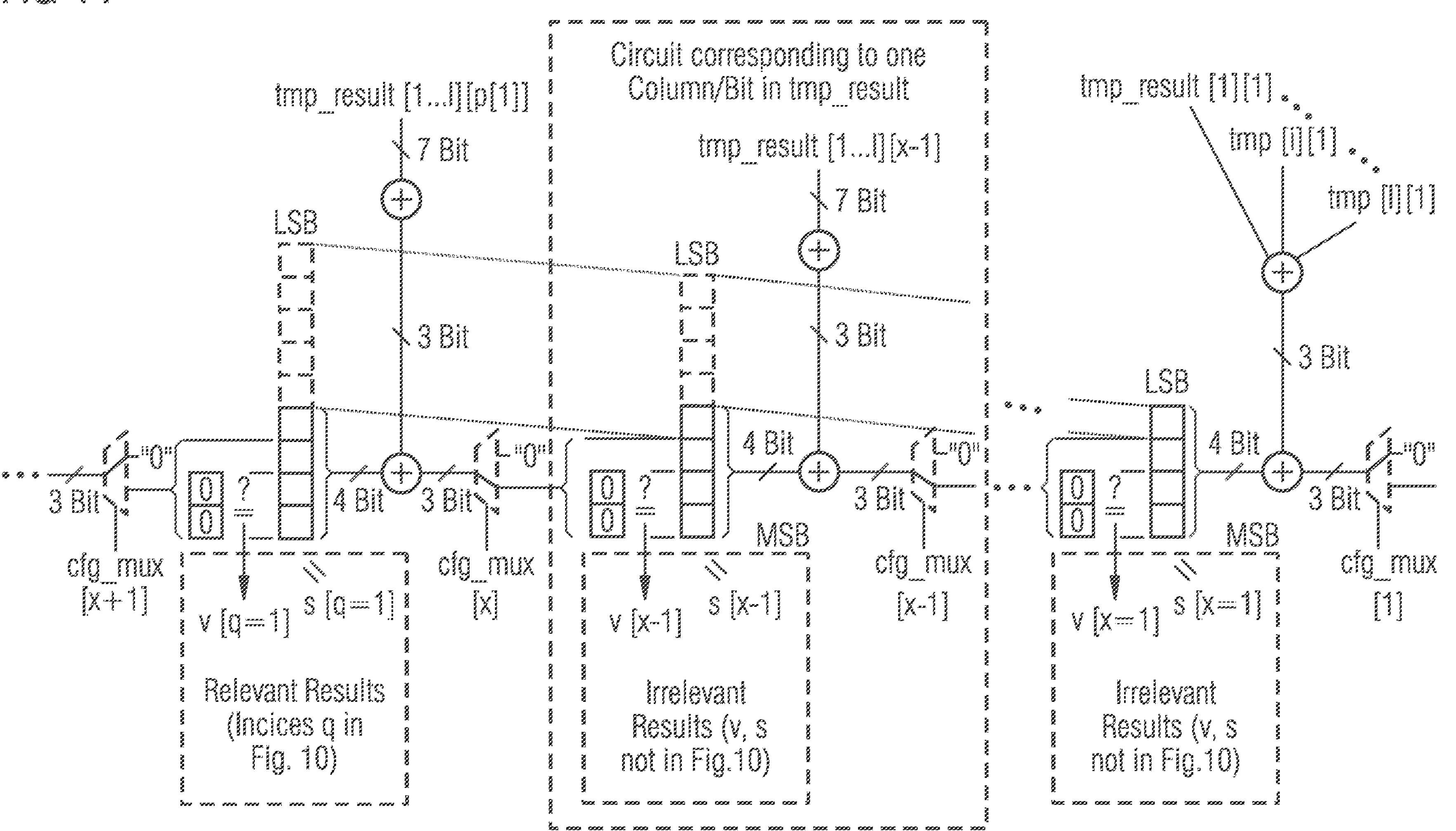
FIG. 11 shows further details of an example embodiment of the combiner with I=7 features.

FIG. 11 shows further details of an example embodiment of the combiner. The implementation of the individual parts is described below using an example of seven features, i.e. I=7, (and LUTs) is explained. The first step (selection/combination and addition of the individual bits with index x of the binary numbers c[i][q]) is performed by a multiplexer and an adder. Here, the LUT outputs are first converted and added column-wise, i.e. the 7 LSBs of all LUTs (index i) are added to a 3-bit value. The result is added to the 3-bit value of the next column (after the latter was virtually multiplied by 2, i.e. shifted to the left by one bit). Thus, p[i] columns corresponding to the bit width of the value c[i][1] result in s[1], i.e. the sum of the 7 added p[i]-bit values. For the next column with index x+1=p[1]+1, which contributes to the next sum s[2], instead of the 3 bits from the summation of tmp_result[i][p[1]] with the previous value the constant “0” is selected by a multiplexer and thus an adder chain is interrupted. For each column or each bit x of the word width X of the LUTs there exists a configuration bit cfg_mux[x] containing the setting of the corresponding multiplexer. Thus, the bit widths of all c[i][q] are freely configurable. By restricting the threshold values to 2^(p[q]−2) also the comparison s[q]<st[q] (=2^(p[q]−2)) is trivial. Only the two most significant bits (MSBs) from s[q] are checked for the value “00”, the least significant bits (LSBs) are irrelevant. If neither bit is set, then v[q]=1. To achieve full reconfigurability of the classifier, each column may be equally implemented, e.g. contains a 3-bit adder as well as a 3-bit multiplexer with configuration bit and a 2-bit comparator logic, however only the results where the next multiplexer (with index x+1) is set to break the adder-chain is relevant and corresponds to the values depicted in FIG. 10. The remaining results s[x], v[x] are ignored.

Figure 12:
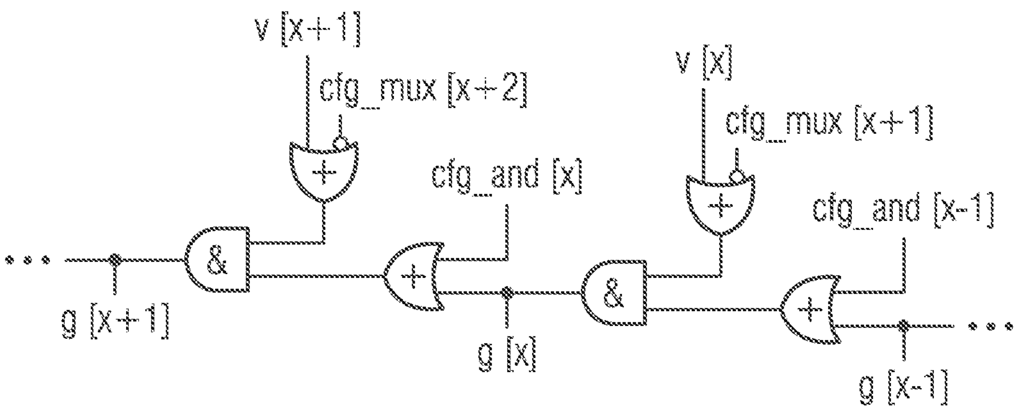
FIG. 12 shows further details of an example embodiment of the combiner.
Figure 13:
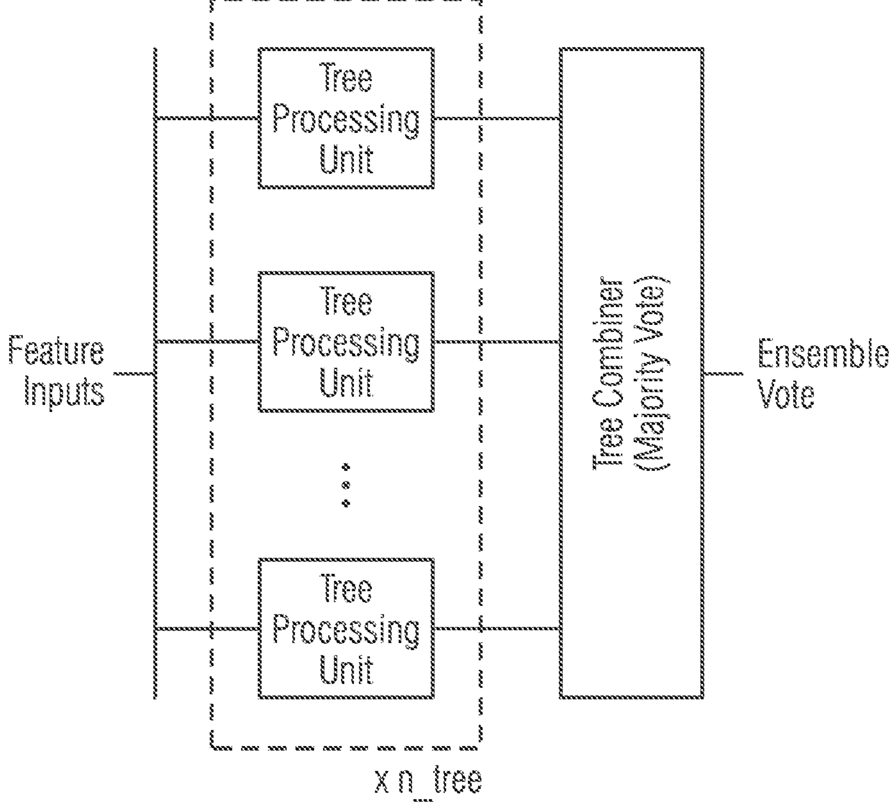
FIG. 13 shows a prior art architecture for decision tree ensemble classification.

FIG. 12 shows further details of an example embodiment of the combiner. The drawing shows an AND-OR chain of the combiner. As one next step, the results of the comparator logic v[q] are AND reduced to the values g[m]. This is done by the depicted AND-OR-chain over all comparator-results. The configuration bits cfg_mux[x+i] can mask irrelevant values v[x] in order to only take relevant ones into account. In addition, a further set of configuration bits cfg_and[x] interrupt the AND-OR-chain at the border between groups and can be used to determine the relevant values g[x], where cfg_and[x]=1, corresponding to values g[m] depicted in FIG. 10.

The votes (or classifications) from the combiner unit can be evaluated by a separate aggregation unit that performs a majority vote. Optionally, the 1-bit values g[m] can be multiplied with the weights w[m]. This operation may be performed by multiplexers or sets of AND-gates muting the weights for g[m]=0, but may not be necessary for the application discussed herein. Columns x with not to be considered values are configured with the weight “0”. The results of the weighting are summed with an adder tree to the sum c_sum. A comparator with adjustable threshold value c_thr finally outputs which Class the features on the inputs of the classifier correspond to.

Up to now, AND/OR arrays, XOR circuits, and the arithmetic described above used to calculate the overall result from the LUT values were examined. Although the suggested implementations are already working well it cannot be ruled out that more compact and more efficient structures exist to solve this task and to increase the compression ratio further.

Although this description of the improved concept contains many specifics, these should not be interpreted as limitations on the scope of the concept or what has or can be claimed, but rather as descriptions of features specific to certain embodiments of the invention. Certain features described in this disclosure in connection with separate embodiments may also be implemented in combination in a single embodiment. On the other hand, various features described in connection with a single embodiment can also be implemented in several embodiments separately or in any suitable sub-combination. In addition, although features may be described above as acting in certain combinations and even originally claimed as such, in some cases one or more features may be excised of a claimed combination, and the claimed combination may be directed to a sub-combination or variation of a sub-combination.

Accordingly, even if the operations in the drawings are presented in a specific order, this should not be understood to mean that these operations must be performed in the order shown or in sequential order, or that all the operations shown must be performed to achieve the desired results. Under certain circumstances, multitasking and parallel processing may be advantageous.

A number of implementations were described. Nevertheless, various modifications can be made without deviating from the spirit and scope of the invention. Accordingly, other implementations are within the scope of the claims.

The invention claimed is:

1. An architecture for classification of a decision tree ensemble, the architecture comprising:

a rank computing block; and a tree processing block, wherein the rank computing block comprises one computation unit per feature of a set of features to be classified, wherein each computation unit comprises a memory and a logic, wherein the memory is configured to save threshold values of decision trees in the decision tree ensemble, wherein the memory is configured to save the threshold values in one group per feature, wherein the threshold values in a group are sorted according to a threshold index, wherein the logic is configured to conduct a node comparison of the threshold values of a corresponding group of threshold values and output a rank as a result of the comparison, wherein the rank represents an encoded address representative of a threshold value, and wherein the tree processing block for trees in the decision tree ensemble is configured to determine a class of the features to be classified as a function of ranks.

2. The architecture according to claim 1, wherein the features are denoted as $f_i$, with feature index $i \in [1;I]$, wherein I denotes a number of features to be classified, and the threshold values are representative of nodes of trees in the decision tree ensemble, wherein the logic is configured to receive a feature to be classified and to conduct a search which returns the rank for each feature that splits the threshold values into values less than and greater than a feature value, wherein the ranks are output to corresponding tree processing units, respectively, and wherein the tree processing units are configured to determine the classes by evaluating Boolean functions, each being representative of a decision tree in the decision tree ensemble, as a function of the received ranks, respectively.

3. The architecture according to claim 1, wherein the tree processing block comprises an aggregation unit which is configured to receive the determined classes from tree processing units and to form an ensemble vote as a function of the determined classes.

4. The architecture according to claim 1, wherein the memory comprises one group of memory cells for each feature of the set of features to be classified, and wherein the memory cells within the group are addressable according to the threshold index.

5. The architecture according to claim 1, wherein the logic comprises a comparator which comprises a first input operable to receive a feature and a second input operable to receive the threshold value from the memory, and wherein the comparator is operable to conduct the node comparison of the threshold values of the corresponding group of threshold values.

6. The architecture according to claim 5, further comprising tree processing units comprising one or more comparators which are configured to perform an address decoding of the received ranks to evaluate Boolean functions based on address decoded ranks.

7. The architecture according to claim 1, wherein each of the computation units is connected to a dedicated lookup table, respectively, wherein the lookup tables comprise an input side which is operable to receive a dedicated rank from the computation unit, which is connected to the lookup table, and wherein the lookup tables are operable to output intermediate values as a function of the ranks received at the input side.

8. The architecture according to claim 7, wherein each of the rank computing blocks is connected to the dedicated lookup table, respectively, wherein the lookup table comprises an output side which is operable to provide the intermediate values of tree processing units connected to the lookup table, and wherein the tree processing units are operable to determine the class of the features to be classified as a function of the received intermediate values.

9. The architecture according to claim 7, further comprising a combiner with an arithmetic unit, which is operable to receive the intermediate values and is operable to combine and/or weight the intermediate values and to output the class of the features to be classified.

10. The architecture according to claim 7, wherein the tree processing block comprises one or more lookup tables, and wherein the lookup tables are implemented based on an associative memory comprising one or more comparators operable to conduct a "less than" or "greater than" comparison.

11. A method for classification of a decision tree ensemble, the method comprising:

saving threshold values representative of decision trees in the decision tree ensemble into one group per feature to be classified;

sorting the threshold values of a group according to a threshold index;

conducting a node comparison of the threshold values of a corresponding group of threshold values;

outputting a rank as a result of the node comparison, wherein the rank represents an encoded address representative of a threshold value; and determining a class of the features to be classified as a function of ranks.

12. The method according to claim 11, wherein the features to be classified are denoted as $f_i$, with feature index $i \in [1;I]$, wherein I denotes a number of features to be classified, and the threshold values are representative of nodes of trees in the decision tree ensemble, wherein the method further comprises:

receiving a feature to be classified by a logic and, using the logic, conducting a search which returns the rank for each feature that splits the threshold values into values less and greater than a feature value, outputting the ranks to corresponding tree processing units, and determining the classes of the feature to be classified by evaluating Boolean functions, each being representative of a tree in the decision tree ensemble as a function of the received ranks, respectively.

13. The method according to claim 11, wherein the ranks are determined from a binary search using a logic, or wherein the ranks are determined from an in-memory process.

14. The method according to claim 11, wherein an evaluation of the decision trees involves a look-up table with pre-calculated values, which are saved as look-up table entries, and wherein the classes are determined depending on the look-up table entries.

15. The method according to claim 14, wherein the look-up table entries are determined by training software, which determines an assignment of the look-up table entries, such that both a mathematical description of a classification architecture and a mathematical description of the decision tree ensemble are equivalent.

* * * * *